(12) United States Patent  
Lee

(10) Patent No.: US 9,174,699 B2  
(45) Date of Patent: Nov. 3, 2015

(54) BICYCLE TOW DEVICE

(71) Applicant: Patrick Lee, Miami, FL (US)

(72) Inventor: Patrick Lee, Miami, FL (US)

( * ) Notice: Subject to any disclaimer, the term of this patent is extended or adjusted under 35 U.S.C. 154(b) by 33 days.

(21) Appl. No.: 14/220,742

(22) Filed: Mar. 20, 2014

(65) Prior Publication Data

US 2015/0266537 A1 Sep. 24, 2015

(51) Int. Cl.
*B62K 27/12* (2006.01)
*B62J 11/00* (2006.01)

(52) U.S. Cl.
CPC . *B62K 27/12* (2013.01); *B62J 11/00* (2013.01)

(58) Field of Classification Search
CPC ............ B62J 11/00; B62K 27/12; B60R 9/06
USPC ........................................................ 280/292
See application file for complete search history.

(56) References Cited

U.S. PATENT DOCUMENTS

| | | | |
|---|---|---|---|
| 718,322 A * | 1/1903 | Davis ............................. | 280/292 |
| 937,835 A | 10/1909 | Mason | |
| 3,778,087 A * | 12/1973 | Kallenbach ................... | 280/292 |
| 3,827,613 A | 8/1974 | Meyer | |
| 4,114,919 A | 9/1978 | Stowe | |
| 5,020,813 A * | 6/1991 | Gottschalk .................... | 280/204 |
| 5,039,120 A * | 8/1991 | Stowe ............................ | 280/204 |
| 5,330,217 A * | 7/1994 | McCarthy ..................... | 280/204 |
| 5,350,184 A * | 9/1994 | Hull et al. ..................... | 280/204 |
| 5,454,578 A * | 10/1995 | Neack ........................... | 280/204 |
| 5,749,592 A * | 5/1998 | Marchetto .................... | 280/292 |
| 5,785,335 A * | 7/1998 | George ......................... | 280/204 |
| 5,842,710 A | 12/1998 | Couture | |
| 6,561,533 B2 | 5/2003 | Snobl | |
| 6,623,021 B1 * | 9/2003 | Nelson .......................... | 280/204 |
| 6,983,947 B2 | 1/2006 | Asbury | |
| 7,000,813 B2 | 2/2006 | Gilstrap | |
| 7,234,719 B2 | 6/2007 | Giese | |
| 7,240,816 B2 * | 7/2007 | Tsai .............................. | 224/501 |
| 8,360,456 B2 | 1/2013 | Peruzzo | |
| 8,882,123 B1 * | 11/2014 | Gingras ........................ | 280/204 |
| 2004/0155428 A1 * | 8/2004 | Leon ............................. | 280/204 |
| 2009/0267319 A1 | 10/2009 | Armstrong | |

* cited by examiner

*Primary Examiner* — Joseph Rocca
*Assistant Examiner* — Marc A Scharich
(74) *Attorney, Agent, or Firm* — Christopher J. Vandam, PA; Chris Vandam

(57) ABSTRACT

A bicycle tow device that attaches to a bicycle to allow the bicycle to tow one or more other bicycles or carry one or more bicycle tires. In some versions the tow device can be installed on the towing bicycle without tools and a towed bicycle can be attached to the tow device without tools. One version of the tow device includes an adjustable support to adjust the tow device so that bicycles of varying frame and tire sizes may be towed. The tow device may also include a skirt within a guide to gently secure the towed bicycle to the tow device.

9 Claims, 2 Drawing Sheets

BICYCLE TOW DEVICE

BACKGROUND OF THE INVENTION

Field of the Invention

The present invention relates to bicycles, and more particularly, to a device to aid in towing one bicycle with another bicycle.

Description of the Related Art

Several designs for towing bicycles have been designed in the past. None of them, however, includes features that allow the device to both lower and move forward the center of gravity of the towed bike relative to the towing bike and to avoid modifications of the towed bike and of the bike doing the towing.

U.S. Pat. No. 4,114,919 issued to Stowe for a Towing Apparatus. However, it differs from the present invention because the Stowe device modifies the bike being towed and dangerously raises the center of gravity of the combination of towed and towing bikes as well as several other differences.

U.S. Pat. No. 8,360,456 issued to Peruzzo for an Apparatus for Towing Bicycles. U.S. Pat. No. 6,983,947 issued to Asbury for a Bicycle Towing Device. The Peruzzo and Asbury devices, among other differences, utilize both an articulating hinge between the towed and towing bikes and a cumbersome attachment means between the bikes. These features cause instability and unnecessary complications for ease of use as well as safety for both the rider and bikes.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a convenient means for a single bicycle rider to simultaneously move multiple bicycles.

It is another object of this invention to provide a safe and stable platform for one bicycle to tow another.

Another object of the invention is to provide a bicycle towing device that can be effectively used without the use of any tools and that remains suitable for bicycles of varying frame and tire sizes.

It is still another object of the present invention to provide a bicycle towing device that does not require any permanent modifications to either the towed bicycle or the towing bicycle.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
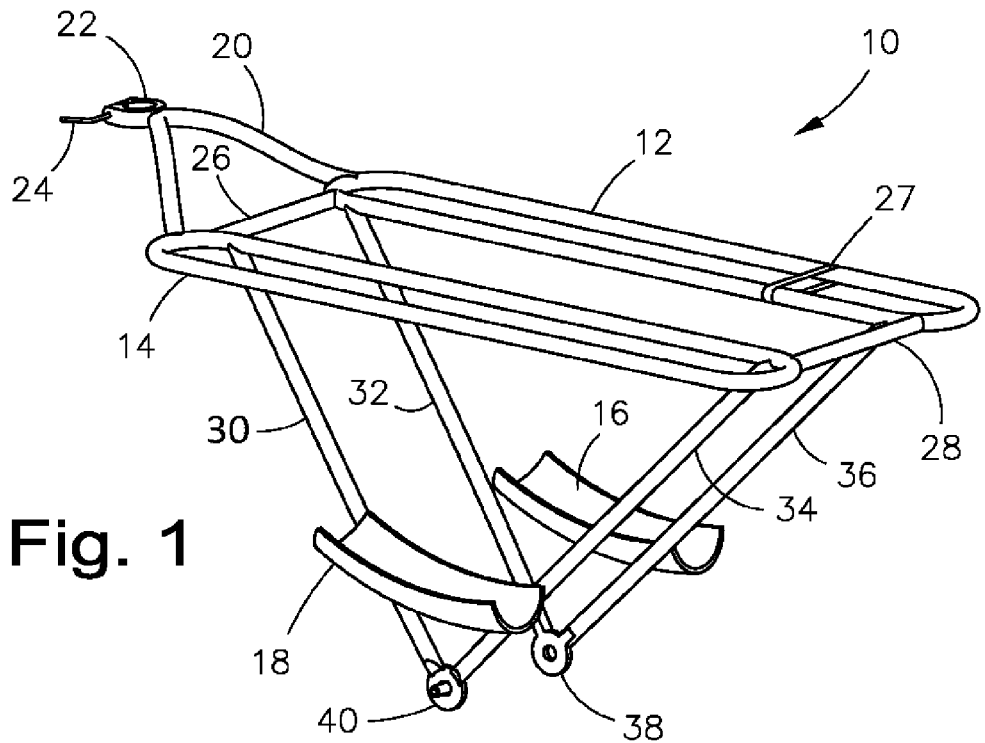
FIG. 1 represents a perspective view of an example of a bicycle tow device.

The drawings are intended to be read in combination with the specification, abstract and claims to characterize the nature of the invention. The drawings are intended to be examples of how a bike tow may manifest but are not intended to show specific proportions or imply measurements that are not directly related in the specification and other written portions of this document.

Similarly, some of the drawings include examples of optional features that may or may not be included in another version of the invention. Some of the parts and other elements described may be mixed and matched with other elements to comprise a complete device and yet remain within the intent and scope of the inventive concepts.

The present invention is sometimes referred to as the device, the invention, the bicycle tow device, a bike tow, the apparatus or other terms as may be appropriate in context. Likewise the masculine, feminine and neuter are generally intended to be interchangeable as contextually appropriate.

In some of the examples herein there are two bicycles involved in the useful process of one bicycle towing another bicycle. Sometimes this is referred to as the towing bike as contrasted to the towed bike. Likewise, it may also be referred to as the front bike and the rear bike or bikes, depending on context.

Referring now to the drawings, where the present invention is generally referred to with numeral 10, it can be observed that it basically includes a guide 12, a guide 14, a support 16, a support 18, a yoke 20, a coupler 22, a lock 24, a brace 26, a brace 28, a strut 30, a strut 32, a strut 34, a strut 36, a connector 38, a connector 40, a bike assembly 42, a seat post 44, an axle 46, a frame 48 and a rear wheel 50.

Figure 2:
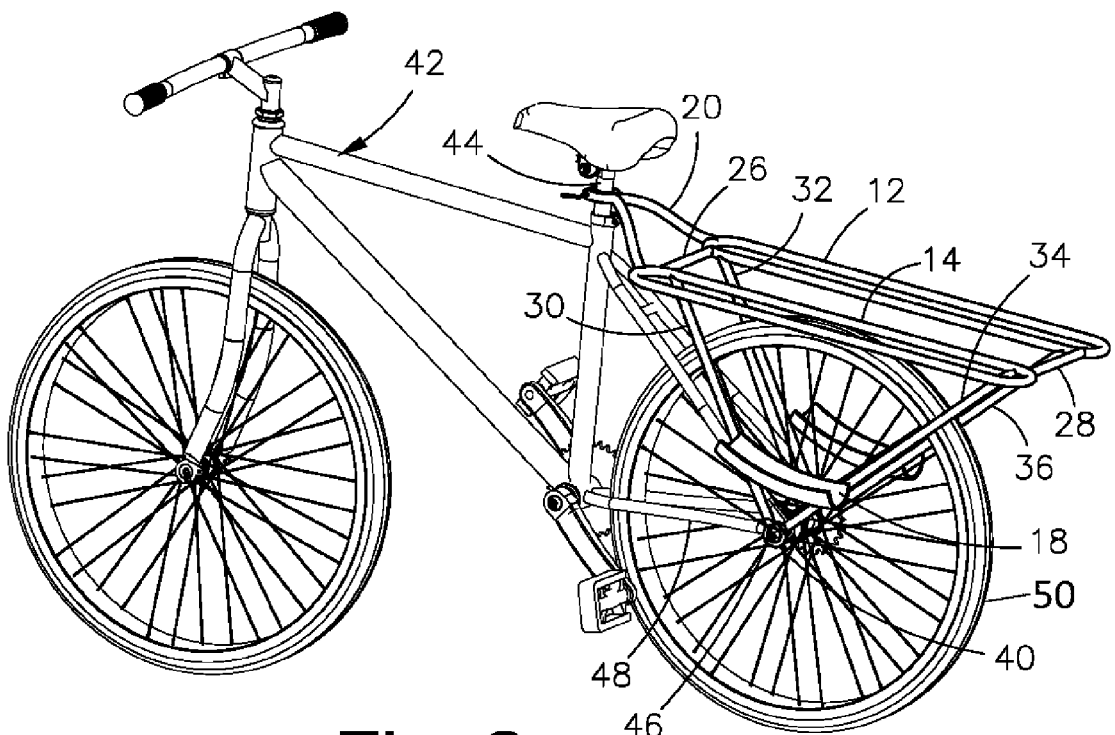
FIG. 2 shows a perspective view of a bicycle tow device similar to the example shown in FIG. 1 that has been attached to a bicycle.

A version of a generally complete bike tow device is shown in FIG. 1, apart from the other elements of a bicycle. The device in FIG. 2 is similar to that in FIG. 1, save for the addition of a bicycle equipped to tow another bicycle using the device.

This version of the bike tow device is rigidly affixed to the towing or front bicycle at multiple points. The coupler 22 attaches to the seat post 44 and then optionally locked in place with the lock 24 to hold the coupler 22 securely in place on the seat post 44. To connect the device to the seat post 44, in some configurations the seat post 44 may have to be temporarily removed from the bicycle's frame 48.

The bike tow may also be attached at both ends of the axle 46 centered about the rear wheel 50 of the towing bike, one on the left and the other side on the right. The connector 40, in this version, connects to the left end of the axle 46. Similarly, the connector 38 is affixed to the right end of the axle 46.

If attached at the axle, then depending on the dimensions of the axle 46, it may be necessary to utilize a longer axle. This is to ensure that there is sufficient space on the axle to add the thickness of the combination of the connector 38 and connector 40 and still be able to affix the axle nuts (or other known connecting means) onto the axle so that the wheel 50 remains rotatably connected to the frame 48.

The lower right and lower left side of the frame assembly can alternatively be affixed to an area on the frame near the rear axle. Many modern bikes have a flange near to where the rear axle traverses the frame on both the left and right sides of the bicycle frame. This flange is provided as a point to attach accessories to the frame and could be a suitable attachment point for each the lower left and lower right side of the frame assembly.

In the embodiment of the device shown in FIGS. 1 and 2 is generally bilaterally symmetrical on the left and right sides. The front of the yoke 20 is rigidly affixed to the coupler 22. The rear of the yoke 20 is rigidly connected to the brace 26.

On the left side of the device the brace 26 is affixed to the guide 14 and the strut 30. The strut 30 terminated at a bottom end terminates at the connector 40 that connects to the axle 46. Similarly, the right side of the brace 26 is affixed to the guide 12 and the strut 32. The strut 32 at a bottom end terminates at the connector 38 that in turn connects to the right side of the axle 46.

It can now be seen that this version of the device has three points of connection to the towing bicycle: the coupler 22, the connector 38 and the connector 40. It should be appreciated that there are no permanent modifications necessarily made to the towing bike to attach the bike tow device to the bike. In fact, many modern bicycles onto with which the device may effectively be used have cam lock connectors at both the seat post 44 and securing the axle 46 to the frame 48 so that no tools are required for either installation or removal of the device from a bicycle.

An alternative to a coupler 22 may be an attachment means to connect the bike tow device to a part of the towing bicycle's frame other than at the seat post 44. For example, the forward connection of the bike tow device to the towing bicycle may be the frame 48 of the tow bicycle itself. This may require the use of clamps, brackets or other fastening means not shown in the drawings.

Still referring to FIGS. 1 and 2, the strut 34 connects at a lower end to the left side of the axle 46 at the connector 40 and on an upper end to a rear section of the guide 14. Reflectively, the strut 36 connects at a lower end to the right side of the axle 46 at the connector 38 and on an upper end to a rear section of the guide 12. The rear section of the guide 12 and rear section of the guide 14 are connected to each other by the brace 28 resulting in a rigidly structured bike tow.

Each of the left and right sides of the bike tow has a support onto which a tire of the bike being towed rests. The support 18 is on the left side and could be fixed to either or both of the strut 30 and strut 34. Likewise the support 16 is on the right side and is supported by either or both of the strut 32 and strut 36.

The support 16 and support 18 preferably is adapted to support a variety of different sizes of tire widths and diameters. These supports 16 and 18 can optionally narrow at a bottom center to effectively wedge any width tire reasonably calculated to be used with the device. The profile from the front or back could be "U" shaped or "V" shaped or other similar profile to hold the towed bike's tire.

Other shapes and configurations of the supports 16 and 18 could take a form of an oval that the bottom of the towed bike's tire partially enters into, possibly on the order of an inch or several of inches. Preferably the supports 16 and 18 both support the tire of the towed bike near the bottom of that tire and substantially limit lateral movement of the towed bike's tire in the device while it is being towed.

The supports 16 and 18 could also be a pair of posts for each the left and right side, protruding from the respective struts, struts 30 and 34 for the left side and struts 32 and 36 for the right side. In this version the posts would be substantially parallel to the axle 46. The posts could have hooks at the outboard sides to aid in securing the tire of the bicycle being towed in the bike tow.

The guides 12 and 14, braces 26 and 28, struts 30, 32, 34 and 36 essentially form a rigid frame in combination.

Of course there may be variations on the configuration of the supporting frame as described immediately above that will still fall within the clear scope of a bike tow as described herein.

In at least one version of the bike tow a stop 27 is provided transverse to the long axis of the guide 12 or guide 14. The stop 27 is adjustable along the front to back length of the guide 12 or 14 and is fixable onto the guide 12 or 14. The stop 27 may be used when a bike tire smaller having a diameter smaller than the front to back opening of the guide 12 or 14. The stop 27 can secure that smaller tire so it cannot slide unnecessarily front and back within the sides of guide 12 or 14. The stop 27 could be band, clip, bar or other such means to effectively shorten the opening of the guide 12 or 14. In most uses it would be preferred to keep the towed bicycle's tire as far forward as possible to maximize stability and the stop 27 helps achieve that end.

There are advantages to secure the bicycle being towed as far forward, toward the towing bike, as possible to shorten the combined length of the towed bicycle and the towing bicycle. This configuration lends itself to stability, which can become more important the heavier the bicycle being towed. This needs to be balances with the design consideration that the driver of the towing bicycle should not be significantly impeded by a bicycle being towed.

Other advantages for stability can be achieved by dimensioning and adapting the bike tow to hold the towed bicycle as low as design limits allow. Obviously, a taller combination of a tow bike and a bike being towed can tend to be more tippy.

Further stability design considerations should be made to construct a bike tow that can simultaneously hold two bikes as near to the centerline of the towing bike as practicable. This also reduces the tendency of the combination of a towing bike and towed bike. This is particularly important when only one towed bike is attached to the towing bike.

To enhance safety and stability it is generally preferred that the towed bicycle not have a human passenger when connected and being towed by the front bike. By reducing the combined overall weight to be limited to that of the towing bike, its driver and one or more towed bicycles the robustness and weight of the bike tow device itself can be reduced for that specific configuration.

All of these design considerations discussed herein should be viewed in combination with the needs of a driver of the towing bike and the ability to fit multiple bicycles onto the bike tow at the same time. There must be space for the driver to pedal and sit as she would normally drive the towing bike whether there are any other bicycles in tow or whether there is a single drive on a single bike.

The bike tow components as shown in FIGS. 1 and 2 generally are preferred to be rigid and strong. For illustration purposes, it could be made of aluminum, metal alloys or carbon fiber. Some of the components may be constructed of plastics, steel, rubber or other suitable material that may be known in the art.

Merely by way of example and not intending to be limiting, construction methods could include a bent aluminum tubing or rod. Welding or other joining methods of sub-components could also be effective materials for fabrication. In the instance of carbon fiber or fiberglass other molding and forming options may be available. Stamping, pressing and other fabrication means known in the art may also be effectively employed.

Generally, the front bike or towing bike is driven by a human driver. When the driver desires to connect one or more towed bicycles to the bike tow device the front tire of each towed bicycle is secured into either the guide 12 or guide 14. When two bicycles are being towed by one front towing bicycle the two towed bicycles are substantially side by side with each other.

When a single bicycle is being towed by a towing bicycle it would generally be the drivers preference as to which side onto which to affix the towed bicycle.

In another embodiment not depicted in the drawings there may be a single position for towing one bicycle instead to the two-bike-towing versions shown in the figures. In this variation the towed bicycle's tire could be adjacent to the left or right of the towing bicycle's rear tire to maintain better mass distribution.

The bike tow device need not only be used to tow bicycles. It could also readily be used to carry only a spare tire or tires. For example, a user might drive a bike to a race track in the city. For the travel to the track the driver may prefer stronger, wider tires with rims. When the driver reaches the race track then the carried tires can be fitted onto the bike allowing the bike to be driven with narrower tires on the smooth race track without risk of damaging any equipment.

Figure 3:
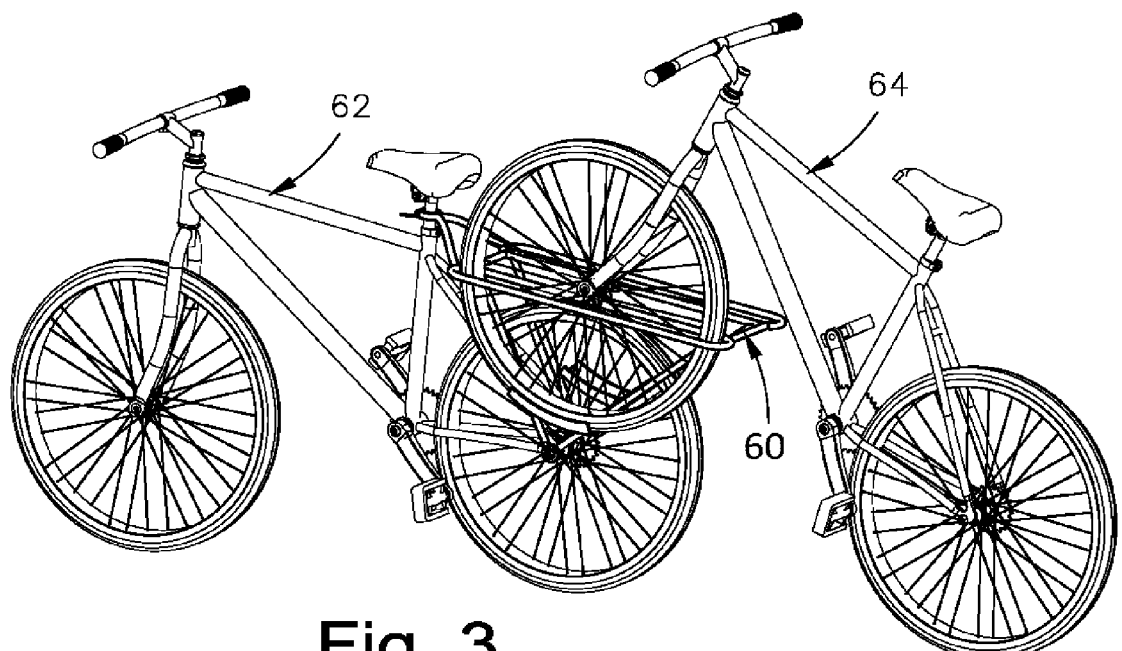
FIG. 3 illustrates a perspective view of one bicycle being towed by another bicycle with one embodiment of a bicycle tow device.

Referring now to FIG. 3 where a perspective view of a bicycle with a version of a bike tow installed on it is towing another bicycle. FIG. 3 is shown to include, among other things, a bike tow device 60, a towing bike 62 and a towing bike 64.

FIG. 3 is a typical anticipated configuration of a tow bicycle towing a single bicycle. For clarity's sake a second towed bicycle has been omitted from the drawings. A second towed bicycle could simply be added to the bike tow device immediately to the right of the towed bike with its front tire in the guide 12.

FIG. 3 shows the front tire of the towed bicycle in the guide 14. It should be appreciated that it is also possible to insert the rear wheel of the towed bicycle into either of the guides 12 or 14. In this configuration a means to hold the steering wheel of the towed bicycle straight may optionally be utilized.

Figure 4:
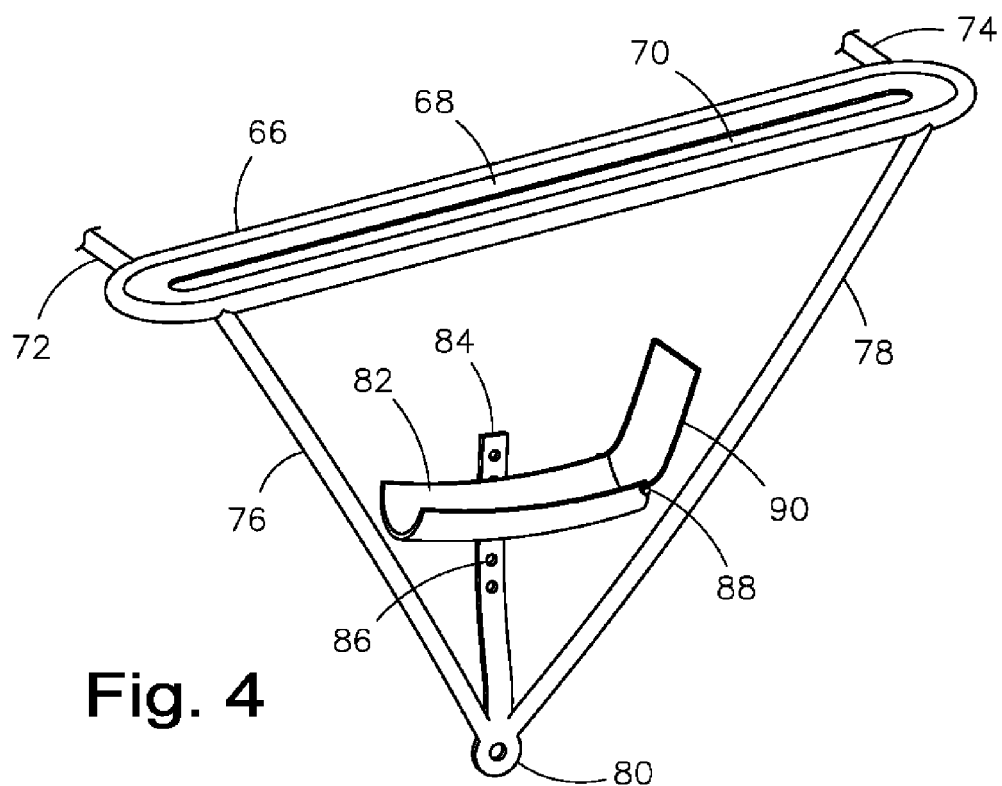
FIG. 4 is a representation of a partial perspective view of an alternate embodiment of a bicycle tow device.

Referring now to FIG. 4 where a perspective view of a variation of a bike tow is shown, this version includes, among other elements, a guide 66, a skirt 68, an aperture 70, a brace 72, a brace 74, a strut 76, a strut 78, a connector 80, a support 82, a post 84, an aperture 86, a spring 88 and a bail 90. This is a partial view showing only one side of this version of the bike tow device and may or may not be supplemented by a corresponding mirror image on the other side. Brace 72 and brace 74, if present, can connect to the other side in similar fashion to the design version shown in FIGS. 1-3.

The skirt 68 is an optional element that spans over the guide 66 to provide additional stabilization of a tire of a towed bike. The skirt 68 may be fabricated of a pliable membrane material such as rubber, foam, leather or other material suitable to aid in securing a towed bike's tire into the bike tow device. Essentially, the skirt 68 allows a friction fit of the towed bike's tire into the aperture 70 between the elements of the guide 66. Struts 76 and 78 are provided as frame elements to fix the several components in relative position.

Generally a perimeter of the skirt 68 is affixed to a perimeter of the guide 66. The aperture 70 may take the form of a slit across the skirt 68 from front to back. The skirt 68 may wear out after substantial use and it may therefore be preferable if it were separable and replaceable with a new skirt 68.

The skirt 68 and aperture 70 combination can prevent the towed bicycle's tire from rattling within the guide 66 during towed transport. This can also obviate the possibility of using supplemental straps or other securing means to connect the towed bicycle with the bicycle doing the towing.

Yet referring to FIG. 4, an optional adjustable support 82 mechanism is also depicted. For some uses of the bike tow device it may be advantageous to adjust the device to fit better with towed bicycles having varying wheel diameters. Common bicycles in use today have wheel diameters in the twenty to twenty eight inch range, and some may differ from those common sizes.

Because the tire of the towed bike is generally inserted only so far into the guide 66 as the connected wheels axle it can be seen that an adjustable support 82 may be beneficial to adequately support the towed bicycle's tire.

It can be extrapolated that if the average tire has a diameter of twenty to twenty eight inches and that generally the tire are inserted to the towed bike's axle that the variance in depth inserted is approximately the difference of the maximum and minimum radii. Specifically, in this example the maximum radius is fourteen inches and the minimum is ten inches then the variability of the position of the support should be about four inches.

FIG. 4 shows the support 82 above the connector 80 where the device would be attached to the axle of the towing bicycle. It is equally fair design to position the support 82 below the tow bike's axle and therefore below the connector 80. The same variability could be effective if above or below the axle.

But a mere example of how to achieve adjustability of the support 82 is shown in FIG. 4 to include a post 84 with a series of apertures 86 spaced at predetermined intervals within the range of adjustability. A pin, clip or other available means can be used to toollessly adjust the position of the support relative to the guide 66.

Also shown in FIG. 4 is an optional bail 90. The bail 90 is biased towards the post 84 and performs to apply pressure, forward or backwards depending on the configuration, of the towed bicycle's tire against the guide 66. A spring 88 may be provided connected to the bail 90 to supply the bias force.

A version of the bike tow device can be fairly described as being comprised of a frame assembly, a support assembly and a guide assembly, among other parts. The frame assembly has a front, a left side and a right side. The front of the frame assembly is affixed to a predetermined location on a bicycle such as the seat post or frame of the bicycle. The left side of the frame at a lower left position is affixed to the bicycle proximate to a left end of a rear axle. This could be the axle itself or a frame element of the bicycle. Similarly, the right side of the frame at a lower position is affixed to the bicycle proximate to a right end of the rear axle. These front and side attachment points rigidly attach the bike to a bike that will tow another bike. The guide assembly is rigidly affixed to a top side of the frame assembly and when attached to a bicycle is substantially horizontal. In other versions, the guide assembly could be higher in the front and lower in the back of the bike so that a bike being towed could enter more from the rear of the bike than solely from above the bike tow. The guide assembly is dimensioned to completely encircle a lower portion of a predetermined bicycle tire and in this way the guide assembly holds a tire from another bike. The support assembly is affixed to the frame assembly below and substantially parallel to the guide assembly so that the predetermined bicycle tire is supported on a bottom side of the predetermined bicycle tire. In other versions the support assembly is horizontal or parallel to the ground.

Some versions of the bike tow device include a pliable skirt membrane is affixed entirely around a periphery of the guide assembly. The pliable skirt membrane includes a centrally located aperture, essentially a slit in the membrane. The aperture could also be formed of adjacent pliable members or overlapping pieces of membrane material. The aperture is dimensioned to accept a predetermined bicycle tire and aids in holding the tire so that unnecessary movement is avoided and stability is enhanced. The support assembly is adjustable relative to the guide assembly so that different diameter tires can be properly supported within the bike tow. The support assembly may also include a spring biased bail that applies forward or rearward pressure onto a tire of a towed bicycle when that tire is inserted into the bike tow device. A strap, clip or other such device could also aid in securing the bottom side of the tire in the bike tow device. In some embodiments, two, three, four or more guide assemblies are affixed to the frame, one to the left and the other to the right of a towing bicycles rear tire, so that two or more bicycles are towed side by side. Generally, the guide assemblies are parallel so that the bike being towed are shoulder to shoulder. The predetermined location on a bicycle where the front of the frame assembly is affixed may be a seat post of the bicycle. The guide assembly may have a stop that is adjustable along a front and back length of the guide assembly and is selectively securable to the guide assembly to aid in securing tires of varying diameters from time to time. The stop can hold the tire more forward in the guide assembly to aid in overall stability.

A version of the bike tow device can be fairly described as having, among other parts, a frame assembly, a support assembly and a pair of guide assemblies. The frame assembly has a front, a left side and a right side. The front of the frame assembly is affixed to a seat post on a bicycle. The left side of the frame at a lower left position is affixed to the bicycle at a left end of a rear axle or near the axle on the bicycle's frame. The right side of the frame at a lower position is affixed to the bicycle at a right end of the rear axle or proximate to the axle on the bicycle's frame. A pair of guide assemblies are rigidly affixed to an upper side of the frame assembly. When attached to a bicycle, a top surface of the pair of guide assemblies is substantially horizontal or can be lower in the back than in the front. The guide assemblies are each dimensioned to completely encircle a lower portion of a predetermined bicycle tire. The guide assembly has a stop that spans a width of the guide assembly and is adjustable along a front and back length of the guide assembly and is selectively securable to the guide assembly. The support assembly is affixed to the frame assembly below and substantially parallel to the guide assembly so that the predetermined bicycle tire is supported. The tire can be a part of a whole bike or just a tire. A pliable skirt membrane is affixed entirely around a periphery of the guide assembly. The pliable skirt membrane includes a centrally located aperture. The aperture is dimensioned to accept a predetermined bicycle tire. The support assembly is adjustable relative to the guide assembly. The support assembly also includes a spring biased bail that applies forward or rearward pressure onto a tire of a towed bicycle when that tire is inserted into the bike tow device.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A bicycle tow device comprised of a frame assembly, a support assembly and a guide assembly;
   wherein:
   the frame assembly has a front, a left side and a right side;
   the front of the frame assembly is affixed to a towing bicycle at a predetermined location on the towing bicycle;
   the left side of the frame assembly is affixed to the towing bicycle at a lower left position proximate to a left end of a rear axle of the towing bicycle;
   the right side of the frame assembly is affixed to the towing bicycle at a lower right position proximate to a right end of the rear axle;
   the guide assembly is rigidly affixed to a top side of the frame assembly;
   the guide assembly is dimensioned to accept and completely encircle a lower portion of a predetermined bicycle tire; and
   the support assembly is affixed to the frame assembly below the guide assembly and is oriented substantially horizontal so that a bottom side of the predetermined bicycle tire is supported on the support assembly.

2. A bicycle tow device as disclosed in claim 1, wherein a pliable skirt membrane is affixed entirely around a periphery of the guide assembly;
   the pliable skirt membrane includes a centrally located aperture; and
   the aperture is dimensioned to accept the predetermined bicycle tire.

3. A bicycle tow device as disclosed in claim 1, wherein a position of the support assembly is adjustable relative to the guide assembly.

4. A bicycle tow device as disclosed in claim 1, wherein the guide assembly extends substantially horizontal.

5. A bicycle tow device as disclosed in claim 1, wherein the support assembly includes a spring biased bail that applies forward or rearward pressure onto the predetermined bicycle tire when the tire is inserted into the bicycle tow device, wherein the predetermined bicycle tire is a tire of a towed bicycle that is towed by the towing bicycle.

6. A bicycle tow device as disclosed in claim 1, wherein two guide assemblies are affixed to the frame assembly, disposed side-by-side in a right and left width direction of the bicycle tow device, and configured such that two predetermined bicycle tires may be accepted and supported by the bicycle tow device.

7. A bicycle tow device as disclosed in claim 1, wherein the predetermined location on the towing bicycle where the front of the frame assembly is affixed, is on a seat post of the towing bicycle.

8. A bicycle tow device as disclosed in claim 1, wherein the guide assembly has a stop that is selectively securable to the guide assembly and a position of the stop is adjustable along a front and back length of the guide assembly.

9. A bicycle tow device comprised of a frame assembly, a pair of support assemblies and a pair of guide assemblies;
   wherein:
   the frame assembly has a front, a left side and a right side;
   the front of the frame assembly is affixed to a seat post on a towing bicycle;
   the left side of the frame assembly is affixed to the towing bicycle at a lower left position proximate to a left end of a rear axle of the towing bicycle;
   the right side of the frame assembly is affixed to the towing bicycle at a lower right position proximate to a right end of the rear axle;

the pair of guide assemblies are rigidly affixed to an upper side of the frame assembly;

a top surface of the pair of guide assemblies extends substantially horizontal;

the guide assemblies are each dimensioned to accept and completely encircle a lower portion of a predetermined bicycle tire of a towed bicycle;

at least one of the guide assemblies has a stop selectively securable to the guide assembly that spans a width of the guide assembly, and a position of the stop is adjustable along a front and back length of the guide assembly;

each of the support assemblies are affixed to the frame assembly below the guide assemblies so that the predetermined bicycle tire of the towed bicycle is supported on one of the support assemblies;

a pliable skirt membrane is affixed entirely around a periphery of each of the guide assemblies;

each of the pliable skirt membranes include a centrally located aperture;

the aperture is dimensioned to accept the predetermined bicycle tire of the towed bicycle;

a position of each of the support assemblies are adjustable relative to the guide assemblies; and each of the support assemblies include a spring biased bail that applies forward or rearward pressure onto the predetermined bicycle tire of the towed bicycle when the tire is inserted into the bicycle tow device.

* * * * *